United States Patent Office 2,881,197
Patented Apr. 7, 1959

2,881,197

PROCESS OF PREPARING ALKYLALKOXY DISILANES

Mamoru Kuriyagawa, Tokyo, and Makoto Kumada, Obama-shi, Fukui-ken, Japan, assignors to Tokyo Shibaura Electric Co., Ltd., Kanagawa-ken, Japan No Drawing. Application September 8, 1953
Serial No. 379,058

Claims priority, application Japan September 13, 1952

3 Claims. (Cl. 260—448.8)

This invention relates to a process of preparing alkylalkoxydisilanes and products containing them and more particularly to a process of preparing alkylalkoxydisilanes from the substances having a higher boiling point which are by-produced in preparing alkylhalogenosilanes by the direct method. The direct method mentioned in the present specification and claims means the process of preparing organic silicon compounds as mentioned in U.S. Patents Nos. 2,380,995, 2,380,996, and 2,380,997.

The inventors of the present invention have found that there are methylchlorodisiloxanes and methylchlorodisilanes having higher boiling points of 75 to 160° C. in the residue after the methylchlorosilanes produced by introducing methyl chloride over a copper-silicon contact mass at about 300° C. in the direct method are distilled at a temperature below 75° C. and removed. We have disclosed in Japanese patent applications Nos. 5,400, filed on April 9, 1952, and 14,441 filed on September 12, 1952 (which corresponds to copending U.S. application No. 379,059, filed on even date herewith) that by alkylating the above mentioned disiloxanes and disilanes, hexaalkyldisiloxanes can be produced from the former disiloxanes and hexaalkyldisilanes from the latter disilanes, respectively.

The primary object of the present invention is to obtain alkylalkoxydisilanes with ease and in a favorable yield by fractionally distilling, separating and alkoxylating, or alkoxylating and then alkylating or vice-versa, methylchlorodisilanes having the following general formula $$(CH_3)_nCl_{6-n}Si_2$$

wherein $n$ is 1, 2, 3, 4 or 5 among the substances of higher boiling points contained in such hitherto abandoned substances. Said methylchlorodisilanes are contained in the fractions above 75° C. and in a comparatively large amount in the fractions specifically at 110 to 160° C. Therefore, it is desirable from the economical point of view to take fractions specifically at 120 to 160° C. When polyalkylhalogenodisilanes obtained by alkylating the methylchlorodisilanes prior to alkoxylation are alkoxylated, polyalkylalkoxydisilanes having many alkyl radicals are obtained. The same results are obtained even by alkylation after alkoxylation of the methylchlorodisilanes. It is needless to say that such selection of alkylation before or after alkoxylation can be optionally effected as required.

Another object of this invention is to obtain a new organic silicon compound from the substances by-produced in directly producing methylchlorosilanes by passing methylchloride onto a contact mass.

Another object of this invention is to very easily obtain alkylalkoxydisilanes from the above by-produced substances.

A further object of this invention is to provide alkylalkoxydisilanes which are not only useful organic silicon compounds for various uses but also important raw materials for polymerizing other organic silicon compounds.

Still further objects of this invention will be clear from the following descriptions.

The alkoxydisilanes obtained by the process of the present invention are represented by the formula $$R_n(R'O)_{6-n}Si_2$$

wherein R and R' designate the same or different alkyl radicals and $n$ is 1, 2, 3, 4 or 5. They can be made fundamental raw materials of organic silicon polymers just the same as alkylalkoxysilanes $R_mSi(R'O)_{3-m}$. For example, we have found that a compound $$\left[-\underset{|}{\overset{|}{Si}}-\underset{|}{\overset{|}{Si}}-O-\right]_n$$

having the silicon-silicon linkage can be synthesized in the siloxane combination $$-\underset{|}{\overset{|}{Si}}-O-\underset{|}{\overset{|}{Si}}-$$

by its polymerization. That is to say, monoalkoxypentaalkyldisilane $$\left.\begin{array}{r}R_5\\R'O\end{array}\right\}Si_2$$

is used as a chain stopper for polymerization just as $R_3SiOR'$, dialkoxytetraalkyldisilane $$\left.\begin{array}{r}R_4\\(R'O)_2\end{array}\right\}Si_2$$

is used as a raw material for making the polymerization chain linear just as dialkyldialkoxysilane $R_2Si(R'O)_2$, and trialkyltrialkoxydisilane $$\left.\begin{array}{r}R_3\\(R'O)_3\end{array}\right\}Si_2$$

is used as a raw material for synthesizing a polymer having a side chain just as monoalkyltrialkoxysilane $$RSi(R'O)_3$$

Other alkylalkoxydisilanes of course have polymerizability and are raw materials for producing polymers having the silicon-silicon linkage.

These alkylalkoxydisilanes are changed to hydroxides through fluorides as shown by $$\left.\begin{array}{r}R_m\\(R'O)_{6-m}\end{array}\right\}Si_2 \longrightarrow \left.\begin{array}{r}R_m\\F_{6-m}\end{array}\right\}Si_2 \longrightarrow \left.\begin{array}{r}R_m\\(OH)_{6-m}\end{array}\right\}Si_2$$

wherein R and R' are any alkyl radicals and $m$ is 4 or 5 or can be changed to siloxane compounds and are, therefore, very useful.

In order that the process and products of this invention may be well understood, several examples follow which are only illustrative and are not intended to limit the scope of this invention in any way.

*Example 1*

When methylchloride in the gaseous state was passed over a copper-silicon contact mass heated at about 300° C., methylchlorosilanes were obtained at a boiling point below 75° C. The residue after these methylchlorosilanes were separated by distillation was heated again. The main composition of the fraction (its chlorine content being 48.9%) at a boiling point of 154.5 to 156.8° C. was trimethyltrichlorodisilane $$\begin{array}{c}CH_3 \quad (CH_3)_2\\ \diagdown \quad \diagup \\ Si-Si \\ \diagup \quad \diagdown \\ Cl_2 \quad Cl\end{array}$$

48 g. of anhydrous ethanol were added to 68 g. of said fraction in the presence of 74 g. of dry pyridine. The mixture was made to react in ether under ice cooling. When the pyridine salt was separated from the product thus obtained by filtration and the filtrate was refined at reduced perssure (13 mm. Hg), 14 cc. of a fraction at the boiling point of 72.5 to 74° C. was obtained. This substance was trimethyltriethoxydisilane

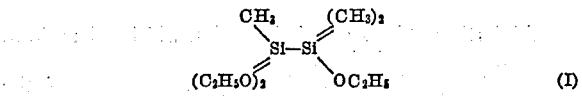  (I)

and had the following properties:

Analysis.—$C_9H_{24}O_3Si_2$

Si: Calculated 23.7%, found 23.9%
$MR_D$: Calculated 67.24, found 67.4

This substance could be used as a raw material of an organic silicon resin for varnish just as methyltriethoxysilane. That is to say, a heat resistant superior resin was obtained when said substance was cohydrolyzed and copolymerized with dimethyldichlorosilane $(CH_3)_2SiCl_2$ or Compound II mentioned later, and enamel was obtained when dissolved in toluol.

Example 2

Just as in Example 1, 48 g. of anhydrous ethanol was added to 68 g. of trimethyltrichlorodisilane in the presence of dry pyridine and the mixture was made to react under ice cooling. The pyridine salt was filtered and separated from the above product. When the filtrate thus obtained was distilled at 85 mm. Hg, trimethyltriethoxydisilane (I) was obtained at a boiling point of 106 to 112° C. Methyl magnesium bromide prepared from 7.7 g. of magnesium was dropped into and reacted with 68 g. of (I). After the solution was heated under reflux for several hours and was cooled, the upper layer was removed by decantation and the precipitate was washed with ether and fractionated in a distilling apparatus. Thus, 24.7 cc. of a fraction at a boiling point of 167.5 to 169.3° C. was obtained. This fraction essentially consisted of 1,2-diethoxy-1,1,2,2 tetramethyldisilane

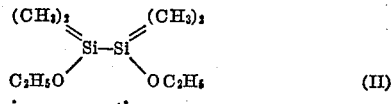  (II)

and had the following properties:

Analysis.—$C_8H_{22}O_2Si_2$

Si: Calculated 27.2%, found 26.4%
$MR_D$: Calculated 61.45, found 61.85
$N_D^{20}$: 1.4200, $d_4^{20}$: 0.8499

When this substance (II) was fluorinated with 47% hydrofluoric acid and was decomposed with normal caustic soda solution, a cyclic compound

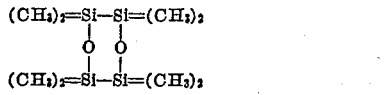

of a melting point of 41 to 43° C. was obtained, which compound could be re-crystallized from petroleum ether. This shows that the ethoxy radicals of the Compound II are linked with respective different silicon atoms and that Compound I has one and two ethoxy radicals connected with respective silicon atom.

Compound II was hydrolyzed with dimethyldichlorosilane to a rubbery substance. The compound was also hydrolyzed with methyltrichlorosilane and then copolymerized to a very heat-resistant resin as a raw material of varnish.

Example 3

78.2 g. of trimethyltriethoxydisilane obtained in Example 1 and of Grignard reagent methyl magnesium bromide prepared from 12 g. of magnesium were reacted with each other. Refluxing was continued for several hours. After cooling, the supernatant liquid was removed by decantation. When the precipitate was washed with ether and was subjected to fractional distillation, the main composition was distilled out at 140 to 145.5° C. (mainly at 144.5 to 145° C.) and 33.6 cc. of the fraction was obtained. This fraction was pentamethylethoxydisilane

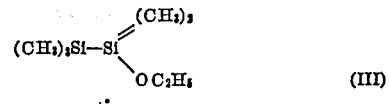  (III)

having the following properties:

Analysis.—$C_7H_{20}OSi_2$

Si: Calculated 31.8%, found 31.5%
$MR_D$: Calculated 56.46, found 55.9

This compound III is valuable as a chain stopper for polymerization just as trimethylethoxysilane $(CH_3)_3SiOC_2H_5$ that is to say, is an organic silicon compound necessary for manufacturing silicone oil and silicone grease.

What we claim is:

1. A process for producing methylethoxydisilane, not in the form of a mixture, of the formula $(CH_3)_n(C_2H_5O)_{6-n}Si_2$ where $n$ is an integer from 4 to 5, which comprises passing $CH_3Cl$ over a coppersilicon contact mass heated at about 300° C. to produce a mixture containing methylchlorosilanes and methylchlorodisilanes, removing methylchlorosilanes by distillation at a temperature up to 75° C., distilling the residue to produce a fraction of boiling point of 154.5° C. to 156.8° C. mainly consisting of trimethyltrichlorodisilane, reacting the fraction with anhydrous ethanol and pyridine until chlorine in the disilane is completely substituted with ethoxy group, distilling the product to take out a fraction having boiling point of 72.5° C. to 74° C. at reduced pressure of 13 mm. Hg and consisting of trimethyltriethoxydisilane, methylating said disilane with methyl magnesium bromide, and fractionally distilling the methylated product.

2. A process of producing tetramethyldiethoxydisilane, useful for the preparation of rubbery substance and varnish, according to claim 1 wherein 68 parts by weight of trimethyltriethoxydisilane is reacted with methyl magnesium bromide prepared from 7.7 parts by weight of magnesium and the thus produced product is fractionally distilled at a temperature of 167.5° C. to 169.3° C.

3. A process of producing pentamethylethoxydisilane, useful for the preparation of silicone oil and silicone grease, according to claim 1 wherein 78.2 parts by weight of trimethyltriethoxydisilane is reacted with methyl magnesium bromide prepared from 12 parts by weight of magnesium and the thus produced product is fractionally distilled at a temperature of 144.5° C. to 145° C.

References Cited in the file of this patent

UNITED STATES PATENTS

| | | |
|---|---|---|
| 2,414,505 | Arntzen | Jan. 21, 1947 |
| 2,566,956 | Pedlow | Sept. 4, 1951 |
| 2,575,141 | Smith-Johannsen | Nov. 13, 1951 |
| 2,598,435 | Mohler | May 27, 1952 |
| 2,612,511 | Orkin | Sept. 30, 1952 |
| 2,706,724 | Bass | Apr. 19, 1955 |

OTHER REFERENCES

Bygden: "Berichte," vol. 45 (1912), pp. 707–713.

Martin: "Berichte der Deutschen Chemischen Gesellchaft," vol. 46 (1913), pp. 3289–95.

Schumb: "Jour. Amer. Chem.," vol. 61 (1939), pp. 363–366.

Abrahamson: "Jour. Org. Chem.," vol. 13 (1948), pp. 275–279.

Burkhard: "Jour. Amer. Chem. Soc.," vol. 71 (1949).